US008601024B2

(12) United States Patent
Kenthapadi et al.

(10) Patent No.: US 8,601,024 B2
(45) Date of Patent: Dec. 3, 2013

(54) SYNOPSIS OF A SEARCH LOG THAT RESPECTS USER PRIVACY

(75) Inventors: Krishnaram Kenthapadi, Mountain View, CA (US); Aleksandra Korolova, Palo Alto, CA (US); Nina Mishra, Newark, CA (US); Alexandros Ntoulas, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 466 days.

(21) Appl. No.: 12/485,058

(22) Filed: Jun. 16, 2009

(65) Prior Publication Data

US 2010/0318546 A1 Dec. 16, 2010

(51) Int. Cl.
*G06F 17/30* (2006.01)
(52) U.S. Cl.
USPC .......................................... 707/776; 707/798
(58) Field of Classification Search
None
See application file for complete search history.

(56) References Cited

U.S. PATENT DOCUMENTS

| 7,472,110 | B2 | 12/2008 | Achlioptas |
| 2006/0002536 | A1* | 1/2006 | Ambrose ................. 379/201.01 |
| 2006/0106793 | A1 | 5/2006 | Liang |
| 2007/0143278 | A1* | 6/2007 | Srivastava et al. ................ 707/5 |
| 2007/0214131 | A1 | 9/2007 | Cucerzan et al. |
| 2008/0294630 | A1 | 11/2008 | Yan et al. |
| 2009/0019002 | A1* | 1/2009 | Boulis ............................... 707/3 |

OTHER PUBLICATIONS

Xiong et al., Towards Privacy-Preserving Query Log Publishing, 2007.*
Silverstein et al., Analysis of a Very Large Web Search Engine Query Log, 1999.*
Boldi et al., From "Dango" to "Japanese Cakes":Query Reformulation Models and Patterns, 2008.*
Craswell et al. 2007. Random walks on the click graph. In Proceedings of the 30th annual international ACM SIGIR conference on Research and development in information retrieval (SIGIR '07).*
Jones et al. 2008. Vanity fair: privacy in querylog bundles. In Proceedings of the 17th ACM conference on Information and knowledge management (CIKM '08).*
Kiseleva, Julia. 2008. Grouping Web Users based on Query Log. Twelfth East-European Conference on Advances in Databases and Information Systems (ADBIS '08).*
Xiong, et al ., "Towards Privacy-Preserving Query Log Publishing", Retrieved at <<http://www2007.org/workshops/paper_136.pdf>>, May 8-12, 2007, Banff, Canada, pp. 4.

(Continued)

*Primary Examiner* — Syed Hasan
(74) *Attorney, Agent, or Firm* — Gonzalez Saggio & Harlan LLP

(57) ABSTRACT

Described is releasing output data representing a search log, in which the data is suitable for most data mining/analysis applications, but is safe to publish by preserving user privacy. The search log is processed such that a query is only included if a sufficient count of that query is present; noise may be added. User contributions that are considered may be limited to a maximum number of queries. The output may indicate how often (possibly plus noise) that each query appeared. Other output may comprise a query-action graph, a query-inaction graph and/or a query-reformulation graph, with nodes representing queries and nodes representing actions, inactions or reformulations (e.g., clicked URLs, skipped URLs, or selected related queries), and edges between nodes representing action, skip or selection counts (possibly plus noise). The output may correspond to the top results/related queries returned from a search.

19 Claims, 4 Drawing Sheets

(56) References Cited

OTHER PUBLICATIONS

Spiliopoulou, et al., "Website Privacy Preservation for Query Log Publishing", Retrieved at <<http://www.barbara.cl/pinkdd2007_pboblete.pdf>>, 2007, pp. 8.

Tang, et al. , "Query Logs Alone are not Enough", Retrieved at <<http://www2007.org/workshops/paper_51.pdf>>, May 8-12, 2007, Banff, Canada, pp. 7.

Bhaduri, et al., "Peer-to-Peer Data Mining, Privacy Issues, and Games", Retrieved at <<http://www.csee.umbc.edu/~kanishk1/papers/Game_LNCS.pdf>>, 2007, pp. 1-10.

Ru, et al., "User Browsing Graph: Structure, Evolution and Application", Retrieved at <<http://www.wsdm2009.org/liu_2009_user_browsing_graph.pdf>>, 2009, pp. 4.

Adar Eytan, "User 4xxxxx9: Anonymizing Query Logs", Retrieved at <<http://www.cond.org/anonlogs.pdf>>, 2007, pp. 8.

Arrington Michael, "AOL Proudly Releases Massive Amounts of Private Data", Retrieved at <<http://www.techcrunch.com/2006/08/06/aol-proudly-releases-massive-amounts-of-user-search-data/>>, Aug. 6, 2006, pp. 1-2.

Tiberi, et al, "Extracting Semantic Relations from Query Logs", Retrieved at <<http://portal.acm.org/ft_gateway.cfm?id=1281204&type=pdf&coll=GUIDE&dl=GUIDE&CFID=25355396&CFTOKEN=36343439>>, Aug. 12, 2007, San Jose, California, USA, pp. 76-85.

Bar-Ilan Judit "Access to Query Logs—An Academic Researcher's Point of View", Retrieved at <<http://querylogs2007.webir.org/slides/JuditBarIlanQL2007.pdf>>, 2007, pp. 11.

Barbaro, et al., "A face is Exposed for AOL Searcher No. 4417749", Retrieved at <<http://w2.eff.org/Privacy/AOL/exhibit_d.pdf>>, Aug. 9, 2006, pp. 1-3.

Blum, et al, "A Learning Theory Approach to Non-Interactive Database Privacy", Retrieved at <<http://www.cs.cmu.edu/~alroth/Papers/dataprivacy.pdf>>, May 17-20, 2008, Victoria, British Columbia, Canada, pp. 9.

Mishra, et al., "When Random Sampling Preserves Privacy", Retrieved at <<http://www.iacr.org/archive/crypto2006/41170195/41170195.pdf>>, 2006, pp. 17.

Craswell et al., "Random Walks on the Click Graph", Retrieved at <<http://citeseerx.ist.psu.edu/viewdoc/download?doi=10.1.1.94.6108&rep=rep1&type=pdf>>, Jul. 23-27, 2007, Amsterdam, The Netherlands, pp. 8.

Dwork Cynthia, "An Ad Omnia Approach to Defining and Achieving Private Data Analysis", Retrieved at <<http://www.niss.org/affiliates/dc200805/Presentations/dwork20080501.pdf>>, Aug. 2007, pp. 13.

Dwork, et al., "Our Data, Ourselves: Privacy via Distributed Noise Generation", Retrieved at <<http://theory.stanford.edu/~kngk/papers/ourDataOurselves.pdf>>, May 2006, pp. 18.

Dwork, et al., "Calibrating Noise to Sensitivity in Private Data Analysis", Retrieved at <<http://people.csail.mit.edu/asmith/PS/sensitivity-tcc-final.pdf>>. Mar. 2006, pp. 1-20.

Fallows Deborah, "Search Engine Users", Retrieved at <<http://www.pewinterent.org/pdfs/PIP_Searchengine_users_pdf>>, Jan. 23, 2005, pp. 36.

Fuxman, et al., "Using the Wisdom of the Crowds for Keyword Generation", Retrieved at <<http://www2008.org/papers/pdf/p61-fuxmanA.pdf>>, Apr. 21-25, 2008, Beijing, China, pp. 61-70.

Thomas, et al., "101 Dumbest Moments in Business, the Year's Biggest Boors, Buffoons, and Blunderers", Retrieved at <<http://money.cnn.com/galleries/2007/biz2/0701/gallery.101dumbest_2007/index.html>>, 2007 (Retrieved Mar. 10, 2009), pp. 1-2.

Pan, et al., "Accurately Interpreting Clickthrough Data as Implicit Feedback", Retrieved at <<http://www.cs.cornell.edu/People/tj/publications/joachims_etal_05a.pdf>>, Aug. 15-19, 2005, Salvador, Brazil, pp. 8.

Pang, et al., "I Know What You Did Last Summer: Query Logs and User Privacy", Retrieved at <<http://www.cs.cmu.edu/~rosie/papers/cikm2007.kanon.pdf>>, Nov. 6-8, 2007, Lisboa, Portugal, pp. 5.

Pang, et al., "Vanity Fair: Privacy in Querylog Bundles", Retrieved at <<http://www.tomkinshome.com/andrew/papers/cikm851-jones.pdf<<, Oct. 26-30, 2008, Napa Valley, California, USA, pp. 9.

Stein, et al., "Social Phobia Subtypes in the National Comorbidity Survey", Retrieved at <<http://ajp.psychiartryonline.org.cgi.reprint/155/51613>>, May 1998, pp. 613-619.

Pang, et al., On Anonymizing Query Logs via Token-Based Hashing, Retrieved at <<http://www2007.org/papers/paper582.pdf>>, May 8-12, 2007, Banff, Alberta, Canada, pp. 629-638.

Talwar, et al., "Mechanism Design via Differential Privacy", Retrieved at <<http://reasearch.microsoft.com/pubs/65075/mdviadp.pdf, Oct. 2007, pp. 10.

Narayanan, et al., "Robust De-Anonymization of Large Sparse Datasets", Retrieved at <<http://www.cs.utexas.edu/~shmat/shmat_oak08netflix.pdf>>, pp. 1-15.

* cited by examiner

SYNOPSIS OF A SEARCH LOG THAT RESPECTS USER PRIVACY

BACKGROUND

A search log contains valuable information about the searches and corresponding actions performed by users as they interact with a search engine. For example, a web search log collects queries and clicks of users issued to an Internet search engine. Alternatively, a search log may contain queries issued by users and actions performed on the displayed results (e.g., logs for enterprise search, mobile search, database search, product catalog search/transactions, and so forth).

A search log can be very useful for providing access to customer services. For example, accessing a search log can help a company improve existing products and services (e.g., keyword advertising) and build new products and services.

Moreover search logs are very valuable data sources that are currently not available to the research community. For example, in many instances an Internet search log is more useful than a web crawl or document repositories as the search log may be used to understand the behavior of users posing queries, and obtain algorithms for problems such as computing related searches, making spelling corrections, expanding acronyms, determining query distributions, query classification, and/or tracking the change of query popularity over time. Advertisers can use such a log to better understand how users navigate to their web pages, gain a better understanding of their competitors, and improve keyword advertising campaigns.

However a search log contains a considerable amount of private information about individuals, and thus a search company cannot simply release such data. Indeed, user searches provide an electronic trail of confidential thoughts and identifiable information. For example, users may enter their own name or the names of their friends, home address, and their medical history as well as of their family and friends. In the case of web search logs, users may enter their credit card number and/or social security number as a search query, just to find out what information is present on the web.

In sum, releasing a search log is beneficial for various data-mining tasks, however doing so risks compromising user privacy. Previous attempts to release search logs while maintaining privacy have failed; one attempt replaced usernames with random identifiers, however the searches were easy to match to an individually identifiable person based on the rest of the data. Other ad-hoc techniques, such as tokenizing each search query and securely hashing the token into an identifier, have been explored in the literature and are shown not to protect privacy.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a search log is processed into information that represents the search log contents (e.g., suitable for most mining/analysis applications), but is safe to publish with respect to preserving user privacy. In one aspect, a query is only included in the output information if the number of times the query is present in the search log or a subset of the search log exceeds a sufficient threshold. Noise may be added to the count. The subset may be generated by limiting how many queries and/or query clicks of each user are included in the data to be processed. Parameters may control privacy versus utility, e.g., the threshold value, the maximum number of queries a user can contribute, the noise values (which may be Laplacian distributions and thus vary for each addition), and so forth.

In one aspect, the output data may comprise query counts, that is, for each query, a count of how many times (plus zero, positive or negative noise) that query appeared in the search log or subset. Other output data may comprise a query-action graph, with nodes representing queries and nodes representing actions, and edges between the query nodes and action nodes indicating how many times (plus zero, positive or negative noise) the action (e.g., a click on a URL, advertisement, image, video, news article and the like) was taken following the query. Note that a query-inaction graph or the like, e.g., that indicates how many times a URL, advertisement, image, video, news article and the like was skipped, may be similarly released. The actions may, for example, correspond to the top URLs returned from a search that was made with the associated query. Still other output data may comprise a query-reformulation graph, with nodes representing queries and nodes representing reformulations (e.g., suggested/related queries), and edges between the query nodes and reformulation nodes indicating how many times (plus zero, positive or negative noise) the reformulation (e.g., a selection of a related query) was taken following the query. The reformulations may, for example, correspond to the top related queries returned from a search that was made with the associated query.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards publicly releasing information of a search log in a way that preserves the log's utility for various data-mining tasks, while at the same time protecting user privacy. As will be understood, this is accomplished by publishing certain data obtained from the search log in a transformed output. The transformation is such that most of the utility of the original data set is preserved, that is, most data mining tasks on a search log can be performed over the published data. At the same time, a rigorous definition of user privacy (that is, differential privacy) is defined, with a transformation mechanism/algorithm configured to preserve the privacy of the published data.

It should be understood that any of the examples herein, such as the type of search logs that may be processed, and the form of the output data, are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data mining in general.

Figure 1:
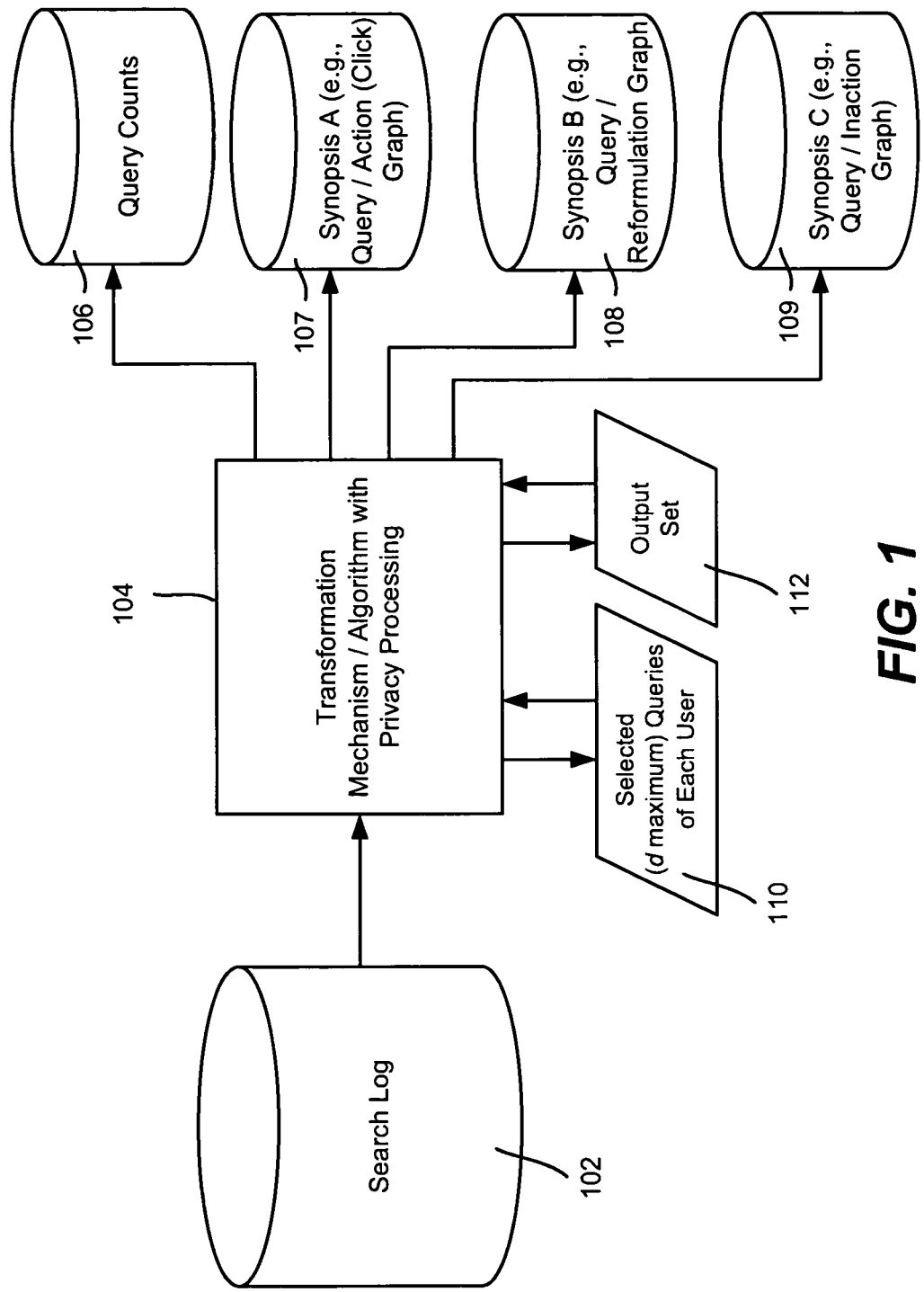
FIG. 1 is a block diagram representing example components for processing a search log into data that is useful for search log analysis and data mining, yet maintains privacy.

Turning to FIG. 1, there is shown general block diagram representing a search log 102 being processed by a transformation mechanism/algorithm 104 into output data. As used herein, a "search log" includes any log that records queries issued by users and actions (e.g. click or purchase) performed on the displayed results. For example, one suitable search log may be a web search log in which each result is a URL and each action is a click. Another suitable search log may comprise a product or service catalog search and transaction log, in which each result is a product or service result, and each action is a purchase. Thus, the technology is not limited to releasing data of web search logs, but can be used to publish any logs where users issue queries and perform actions (such as click or purchase) on some of the displayed results (e.g., logs for enterprise search, mobile search, database search, product catalog search/transactions, library search, and so forth). Further, as can be readily appreciated, not all of the exemplified types of output data need to be released to be of use in data mining; e.g., only counts of queries and click actions may be needed for a given mining/analysis application, depending on the information being sought.

In the example of FIG. 1, the output data includes query counts 106 (e.g., comprising query, query count pairs), and two synapses A and B. The query counts represent an approximate number of times that each query that is safe to publish (as described below) occurs in the log 102.

In this example, the output data also includes one synopsis A, in the form of a privacy-preserving query-action graph 107, comprising a graph over the set of queries and the set of results, where there is an edge connecting a query to a result with weight equal to the number of actions on the result for the query. The query-action graph may be based on the top results for each query, e.g., the graph may represent the approximate query-result action counts for the top results for each query.

Another synopsis B is in the form of a privacy-preserving query-reformulation graph 108, comprising a directed graph over the set of queries, where there is an edge from one query to another query with weight equal to the number of times the first query is reformulated to the second query. The query-reformulation graph may be based on the top reformulations (related/suggested queries that are returned) for each query that are clicked, that is, the graph may represent the query-result reformulation counts for the top related queries returned with the response for each query.

Another synopsis C is in the form of a privacy-preserving query-inaction graph 109. As described below, this reflects for queries and URLs the number of times that a URL was provided in response to a query but no action was taken, e.g., the URL was not clicked, that is, was skipped.

In one embodiment, a concrete, rigorous definition of privacy is adopted, referred to as differential privacy, with the mechanism/algorithm designed to provably satisfy this definition. As will be understood, the mechanism/algorithm is based in part on parameters which can be controlled to achieve a desired level of privacy and utility. Note that while certain parameters are described as examples herein, different parameters may be chosen.

Differential privacy captures a desired notion of privacy, namely that the risk to one's privacy does not substantially increase as a result of participating in the dataset (e.g., as a result of using a search engine). This is accomplished by guaranteeing that any released dataset is almost just as likely to contain the same information whether or not any given individual participates in the dataset. Differential privacy also does not make any assumptions about an adversary's computational power or ability to access additional data beyond that released.

In one implementation, the following variant of differential privacy definition is used:

($\epsilon$, $\delta$)-differential privacy: A randomized algorithm A is ($\epsilon$, $\delta$)-differentially private if for all data sets $D_1$ and $D_2$ differing in at most one element and all $D' \subseteq \text{Range}(A)$, $\Pr[A(D_1) \in D'] \leq \exp(\epsilon) \cdot \Pr[A(D_2) \in D'] + \delta$.

For computation and release of functions such as histograms on the data set, this privacy definition can be further satisfied by adding noise as part of the algorithm. In one implementation, the noise is chosen according to Laplacian distribution, with other parameters that depend on desired privacy parameters ($\epsilon$, $\delta$) and sensitivity of the function (that is, by how much the value of the function can change for inputs differing in one entry).

To further guarantee that any released dataset is almost just as likely whether or not a user uses the search engine to pose queries, the number of queries any user can pose is limited. This protects against any one user having too much influence on the results. In one algorithm, this limit, d is set as a parameter. As the value of d gets larger, more noise is added to guarantee the same level of privacy. It is also feasible to count the same query from the same user only once (or some other limited number); this prevents a user from pushing an infrequent (tail) query to a frequent query (the head) by simply entering the same query over and over.

In general, the mechanism that produces the output data (e.g., counts, privacy-preserving query-action graph and privacy-preserving query-reformulation graph) evaluates a number of input data. In one implementation, to determine which queries to publish (release), if the frequency of the query plus noise exceeds some threshold, the query is published, otherwise it is not. This can be intuitively described as "throwing away tail queries." Note that for each of the queries to be published, the corresponding query counts that are published are noisy counts, i.e. the number of time the query was posed plus noise.

Note that for the query action graph, given the queries that are safe to publish, the top results that surfaced are also safe to publish when interacting with a publicly available engine such as a search engine, library database, or commercial search engine since anyone can pose a query to such a search engine and see those top results. To publish the number of users that perform action on a result, the actual number is computed, and noise added. For the query-reformulation graph, given the queries that are safe to publish, the top related queries shown are also safe to publish, because anyone can pose a query to a search engine and see the top related queries. To publish the number of users that reformulate to a related query shown, the actual number is computed, and noise added. Similarly, related images, videos, advertisements, new stories and products may be published.

Figure 2:
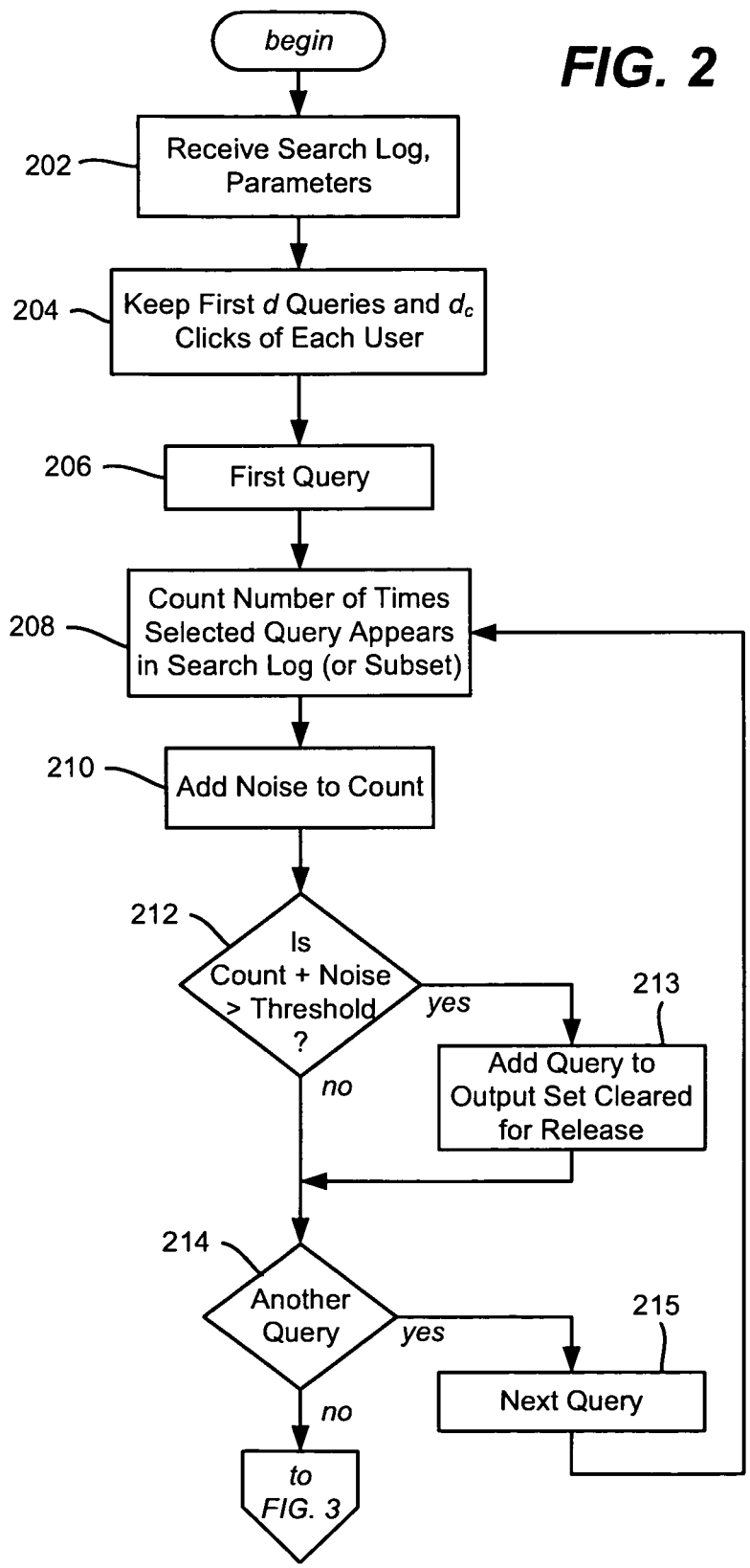
FIGS. 2 and 3 comprise a flow diagram representing example steps for processing queries of a search log data that is useful for search log analysis and data mining, yet maintains privacy.
Figure 3:
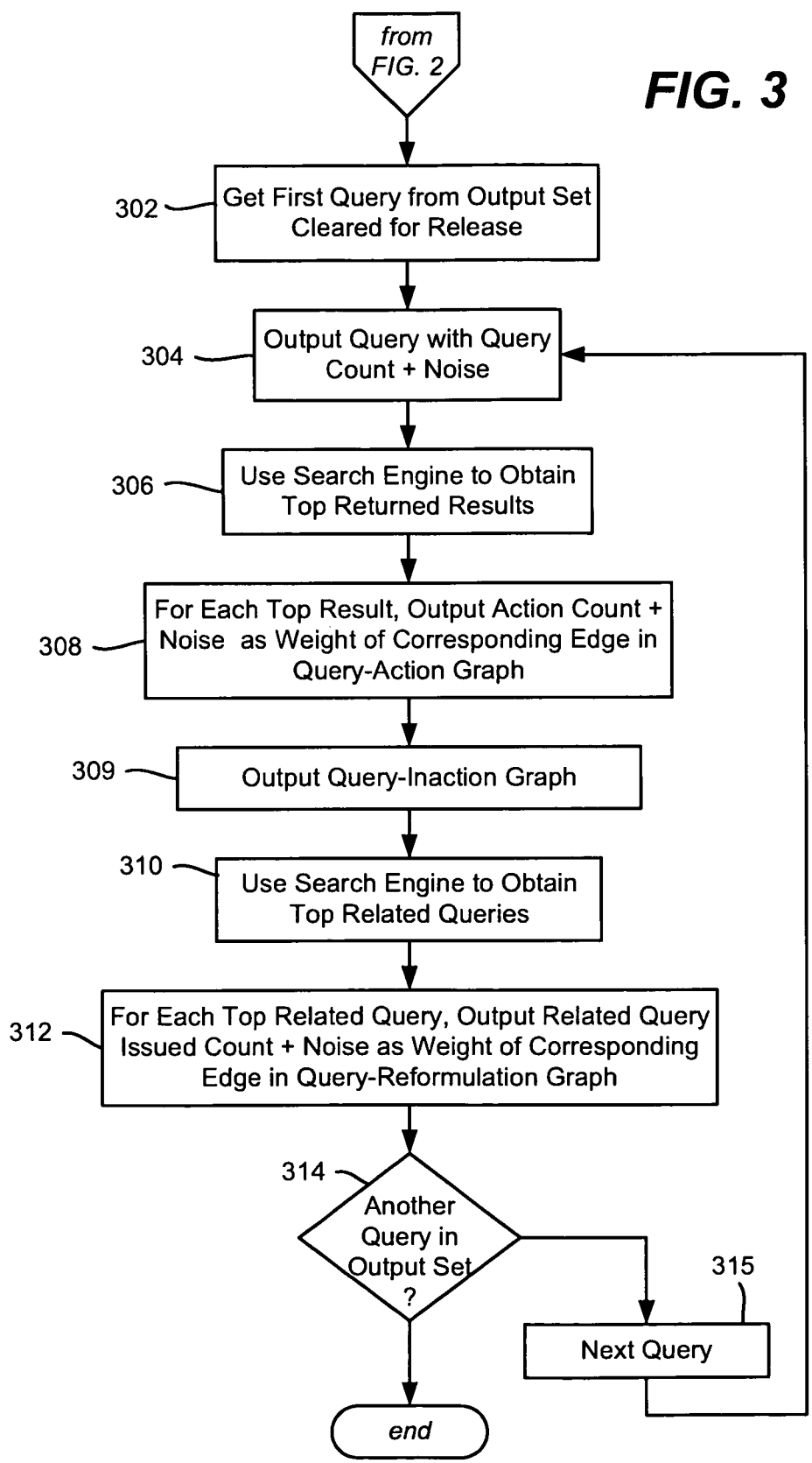

FIGS. 2 and 3 represent example steps performed by the transformation mechanism, beginning at step 202 where the search log and parameters are input. The input includes the search log 102, referred to in the following equations as D; a parameter d that sets the limit on how many queries of any user can be included; a frequency/count threshold, K; and parameters $b_1$, $b_2$ and $b_3$ that indicate the amount of noise to be used in each step.

With respect to releasing queries, for every user whose activity is recorded in the search log, step 204 removes the queries except the first d queries of the user from D. Note that in general, any set of d queries of the user can be retained, such as a random selection or pattern that limits the number to d; further, a limit may not be mandatory. Thus, further processing may take place on the search log itself, or on a subset of the queries for processing, e.g., on the block 110.

Then, for every query q that remains in D, (represented in FIG. 1 by the block 110), starting with a first query at step 206, the occurrence count is obtained, that is, let M(q,D) denote the number of occurrences of q in D. The first noise Lap($b_1$) is added to the count at step 210. Note that instead of Laplacian distribution, other ways to generate the noise may be used, e.g., adding/subtracting a randomly generated number or noise from a different distribution (such as a normal distribution).

Via steps 212 and 213, the query q is evaluated against the threshold frequency count K, and released (to an output set 112 of FIG. 1 for further processing as described below with reference to FIG. 3) if and only if the count plus the noise exceeds the threshold frequency count K. In other words, information about any query is published if and only if M(q,D)+Lap($b_1$)≥K. Note that for any or all noise values, the noise value may be positive, or may be negative such that when added, the noisy count decreases relative to the count value before adding; the noise also may be zero.

Steps 214 and 215 repeat the process that builds the output set 112 until all queries that remained in D have been similarly processed.

FIG. 3 represents further processing the output set 112. Note that in FIG. 3, steps 302, 314 and 315 select each of the queries in the output set to perform the processing of that query.

To release the query counts 106 for every query q cleared for release, (that is, is within the output set 112), step 304 releases its noisy count, M(q,D)+Lap($b_2$). Note that for privacy the second noise parameter is used in this computation.

To build and release the query-action graph, for every query q cleared for release, a search is performed at step 306 using an appropriate search/query engine (e.g., a web "search engine" for a "web search," a database engine for a database query/search and so forth) to obtain the top results returned for q. Then, at step 308, for each result u returned, let C(q,u) denote the number of times an action (such as click) was performed on result u whenever q was issued in D and release the noisy count, C(q,u)+Lap($b_3$) as the weight of the edge (q,u) in the query-action graph. A query-inaction graph may be similarly output (step 309).

To build and release the query-reformulation graph, a search is performed at step 310 using a search engine to obtain the top related queries returned for q. Note that the search of step 306 may obtain both the top results and the top related queries; in other words, only one search need be performed (step 310 is performed as part of step 306).

At step 312, for each related query, q' returned, let R(q,q') denote the number of times the related query q' was issued just after query q was issued in D, and release the noisy count, R(q,q')+Lap($b_3$) as the weight of the edge (q,q') in the query-reformulation graph. Note that a different weight from that used in the query-action graph may be used, e.g., $b_4$ instead of $b_3$.

The algorithm (ALG) achieves ($\epsilon$, $\delta$)-differential privacy with the privacy $$\text{parameters } \epsilon = d\ln(\alpha) + \frac{d}{b_2} + \frac{d}{b_3} \text{ and}$$

$$\delta = \frac{d}{2} \cdot e^{\frac{d-K}{b_1}} \text{ where}$$

$$\alpha = \max\{e^{\frac{1}{b}}, 1 + \frac{1}{2e^{\frac{K-1}{b}} - 1}\}.$$

In other words, for all search logs $D_1$ and $D_2$ differing in at most one user, for all D'⊆ Range(A), for any choice of parameters, K≥1, d, $b_1$, $b_2$, $b_3$, and privacy parameters, $\epsilon$ and $\delta$ defined as above, there is $Pr[ALG(D_1)\epsilon D'] \leq \exp(\epsilon) \cdot Pr[ALG(D_2)\epsilon D'] + \delta$ As noted above, in other embodiments, the parameters in our algorithm (such as the amount or the type of noise to be added) may be chosen in a different manner. For instance, the noise added could be drawn from the Gaussian distribution. Further each user's activity does not have to be limited to only d queries.

Exemplary Operating Environment

Figure 4:
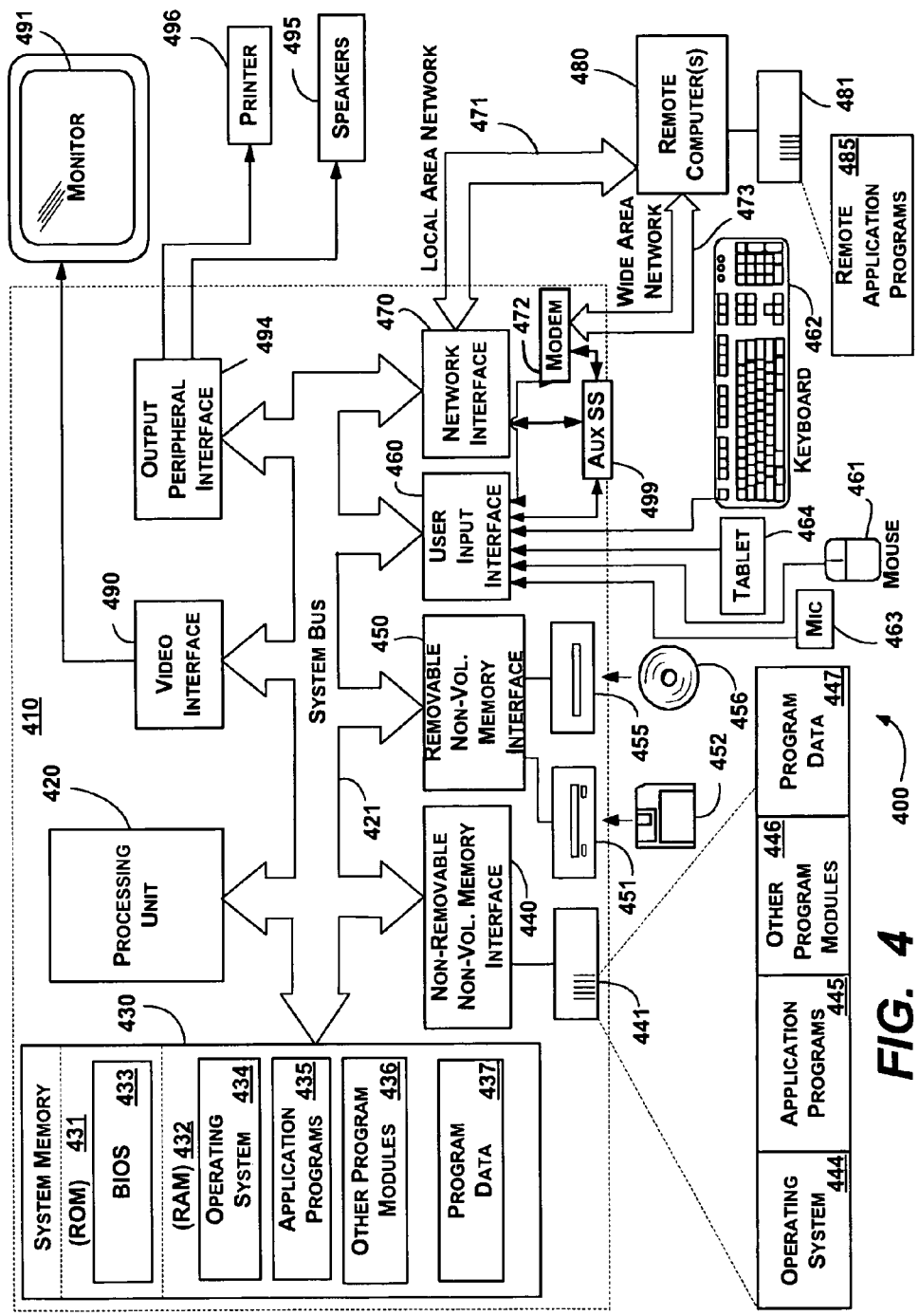
FIG. 4 shows an illustrative example of a computing environment into which various aspects of the present invention may be incorporated.

FIG. 4 illustrates an example of a suitable computing and networking environment 400 into which the examples and implementations of any of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method comprising:
processing a search log, including determining which queries from the search log correspond to information that is safe to publish; and
for each of the queries having information that is safe to publish, publishing the information as output data, wherein determining which queries from the search log correspond to information that is safe to publish comprises limiting how many queries in the search log each user can contribute to a set of queries for processing, wherein publishing the information as output data comprises outputting a query-action graph having nodes representing queries and nodes representing actions taken, with each edge between a query node and an action node having a weight that indicates how many times that action was taken following that query, wherein the weight has zero noise, a negative noise or a positive noise added thereto, or outputting a query-inaction graph having nodes representing queries and nodes representing actions skipped, with each edge between a query node and an inaction node having a weight that indicates how many times that action was not taken following that query, and wherein the weight has zero noise, a negative noise or a positive noise added thereto.

2. The method of claim 1 wherein publishing the information as the output data comprises outputting at least one of:
a query-action graph having nodes representing queries and nodes representing actions taken, wherein the actions taken comprise returned uniform resource locators, or
a query reformulation graph having nodes representing queries and nodes representing reformulated queries, wherein the reformulated queries comprise those that are returned as the top reformulated queries for each query with respect to a search performed with the each query.

3. The method of claim 1 wherein determining which queries from the search log correspond to information that is safe to publish comprises, for each query, determining a count based upon how many times that query appears in the search log or a subset of the queries for processing, and comparing the count to a threshold frequency count.

4. The method of claim 3 wherein the count is a noisy count based on an approximate number of times that the query appears in the search log or a subset of the queries for processing plus a noise value.

5. The method of claim 1 wherein publishing the information as output data comprises outputting a count value for each query that is safe to publish, where this count value corresponds to an approximate number of times that the query appears in the search log or a subset of queries for processing, plus a noise value.

6. The method of claim 1 wherein the actions taken comprise returned uniform resource locators that are clicked following each query, and further comprising, limiting the uniform resource locators to those that are returned as the top uniform resource locators with respect to a search performed with that query.

7. The method of claim 1 wherein publishing the information as output data comprises outputting a query reformulation graph having nodes representing queries and nodes representing reformulated queries, with each edge between a query node and reformulated query node having a weight that indicates how many times that reformulated query was clicked on following that query, wherein the weight has zero noise, a negative noise or a positive noise added thereto.

8. The method of claim 7 further comprising, limiting the reformulated queries to those that are returned as the top reformulated queries for each query with respect to a search performed with that query.

9. The method of claim 1 further comprising, receiving parameters that establish the information that is safe to publish and noise information.

10. In a computing environment, a system comprising:
at least one processing unit;
a transformation mechanism, implemented on the at least one processing unit, configured to process a search log, including by determining which queries from the search log correspond to information that is safe to publish, and for each of the queries having information that is safe to publish, configured to publish the information as output data, wherein determining which queries from the search log correspond to information that is safe to publish comprises limiting how many queries in the search log each user can contribute to a set of queries for processing, wherein publishing the information as output data comprises outputting a query-action graph having nodes representing queries and nodes representing actions taken, with each edge between a query node and an action node having a weight that indicates how many times that action was taken following that query, wherein the weight has zero noise, a negative noise or a positive noise added thereto, or outputting a query-inaction graph having nodes representing queries and nodes representing actions skipped, with each edge between a query node and an inaction node having a weight that indicates how many times that action was not taken following that query, and wherein the weight has zero noise, a negative noise or a positive noise added thereto.

11. The system of claim 10 wherein the transformation mechanism is further configured to output at least one of:
a query-action graph having nodes representing queries and nodes representing actions taken, wherein the actions taken comprise returned uniform resource locators, or
a query reformulation graph having nodes representing queries and nodes representing reformulated queries, wherein the reformulated queries comprise those that are returned as the top reformulated queries for each query with respect to a search performed with the each query.

12. The system of claim 10 wherein the transformation mechanism is further configured to determine, for each query, a count based upon how many times that query appears in the search log or a subset of the queries for processing, and configured to compare the count to a threshold frequency count when determining which queries from the search log correspond to information that is safe to publish.

13. The system of claim 12 wherein the count is a noisy count based on an approximate number of times that the query appears in the search log or a subset of the queries for processing plus a noise value.

14. The system of claim 10 wherein the transformation mechanism is further configured to output a count value for each query that is safe to publish, and wherein the count value corresponds to an approximate number of times that the query appears in the search log or a subset of queries for processing, plus a noise value.

15. The system of claim 10 wherein the actions taken comprise returned uniform resource locators that are clicked following each query, and wherein the transformation mechanism is further configured to limit the uniform resource locators to those that are returned as the top uniform resource locators with respect to a search performed with that query.

16. The system of claim 10 wherein the transformation mechanism is further configured to output a query reformulation graph having nodes representing queries and nodes representing reformulated queries, with each edge between a query node and reformulated query node having a weight that indicates how many times that reformulated query was clicked on following that query, wherein the weight has zero noise, a negative noise or a positive noise added thereto.

17. The system of claim 16 wherein the transformation mechanism is further configured to limit the reformulated queries to those that are returned as the top reformulated queries for each query with respect to a search performed with that query.

18. One or more computer storage devices storing computer executable instructions, which in response to execution by a computer, cause the computer to perform steps comprising:
  processing a search log, including determining which queries from the search log correspond to information that is safe to publish; and
  for each of the queries having information that is safe to publish, publishing the information as output data, wherein determining which queries from the search log correspond to information that is safe to publish comprises limiting how many queries in the search log each user can contribute to a set of queries for processing, wherein publishing the information as output data comprises outputting a query-action graph having nodes representing queries and nodes representing actions taken, with each edge between a query node and an action node having a weight that indicates how many times that action was taken following that query, wherein the weight has zero noise, a negative noise or a positive noise added thereto, or outputting a query-inaction graph having nodes representing queries and nodes representing actions skipped, with each edge between a query node and an inaction node having a weight that indicates how many times that action was not taken following that query, and wherein the weight has zero noise, a negative noise or a positive noise added thereto.

19. The one or more computer storage devices of claim 18 wherein the actions taken comprise returned uniform resource locators that are clicked following each query, and further comprising, limiting the uniform resource locators to those that are returned as the top uniform resource locators with respect to a search performed with that query.

* * * * *